Aug. 20, 1957 G. WALTERS ET AL 2,803,288
APPARATUS FOR MAKING VENETIAN-BLIND LADDER TAPE
Filed July 26, 1954 10 Sheets-Sheet 1
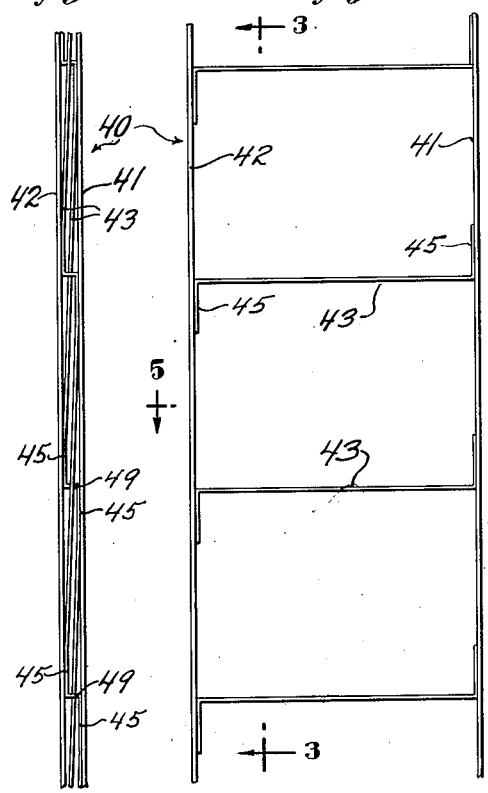
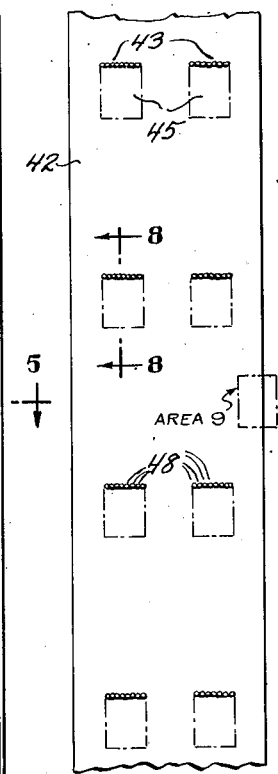
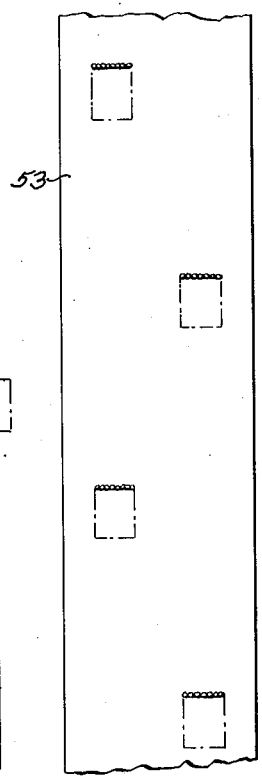
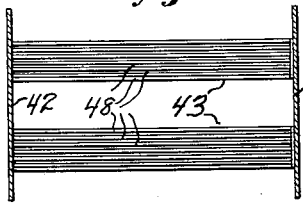
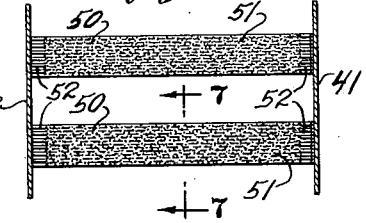
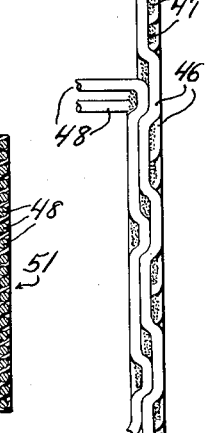
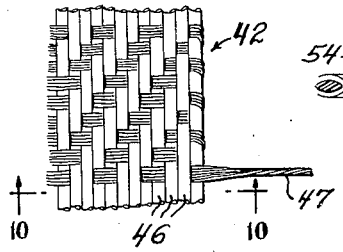
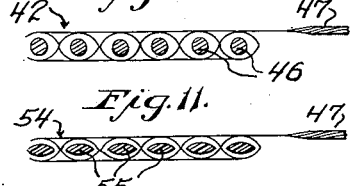
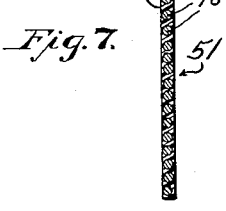
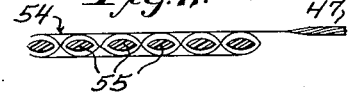
Inventors
Gustav Walters
August Mann
By Frank H. Schwartz
Attorney

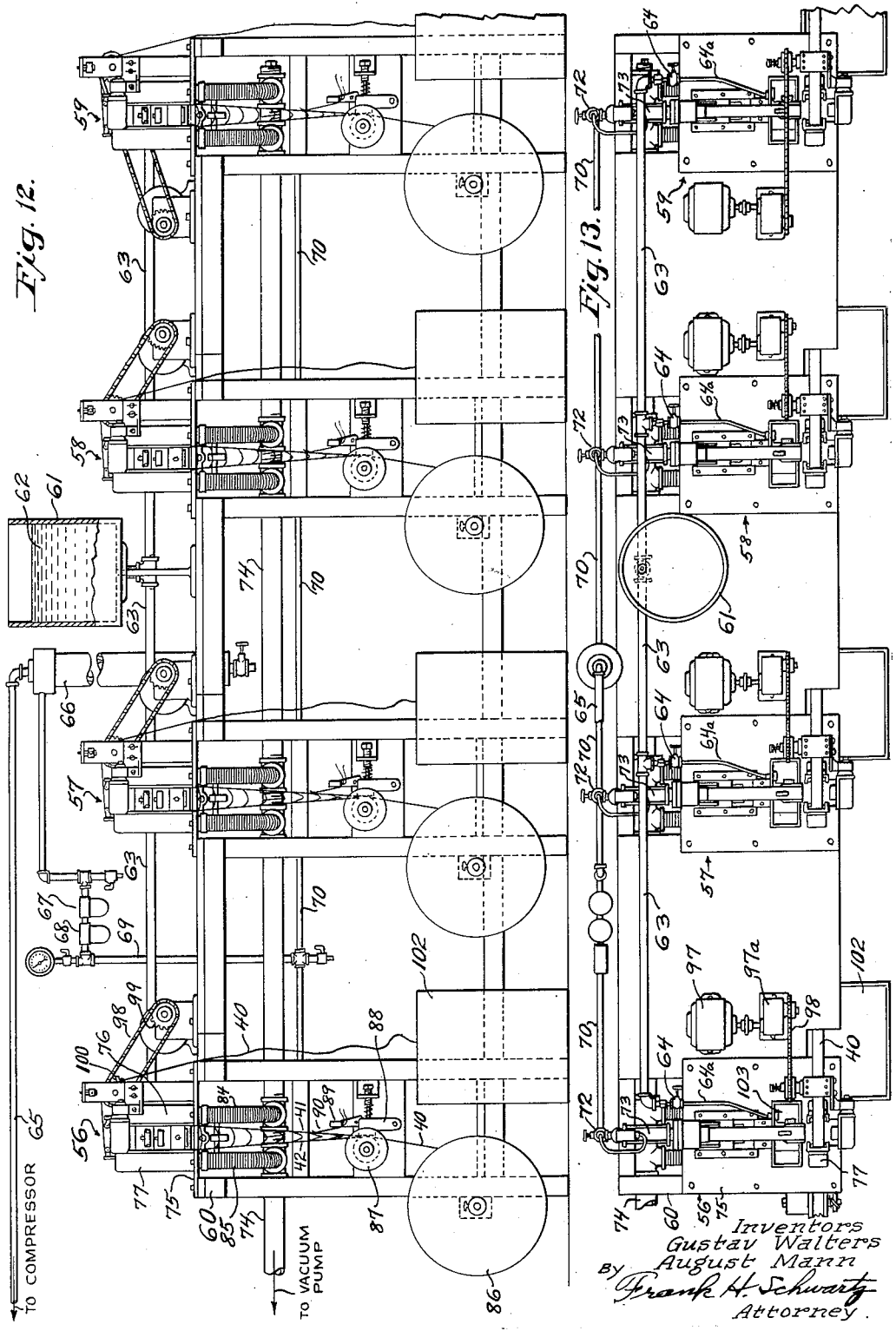

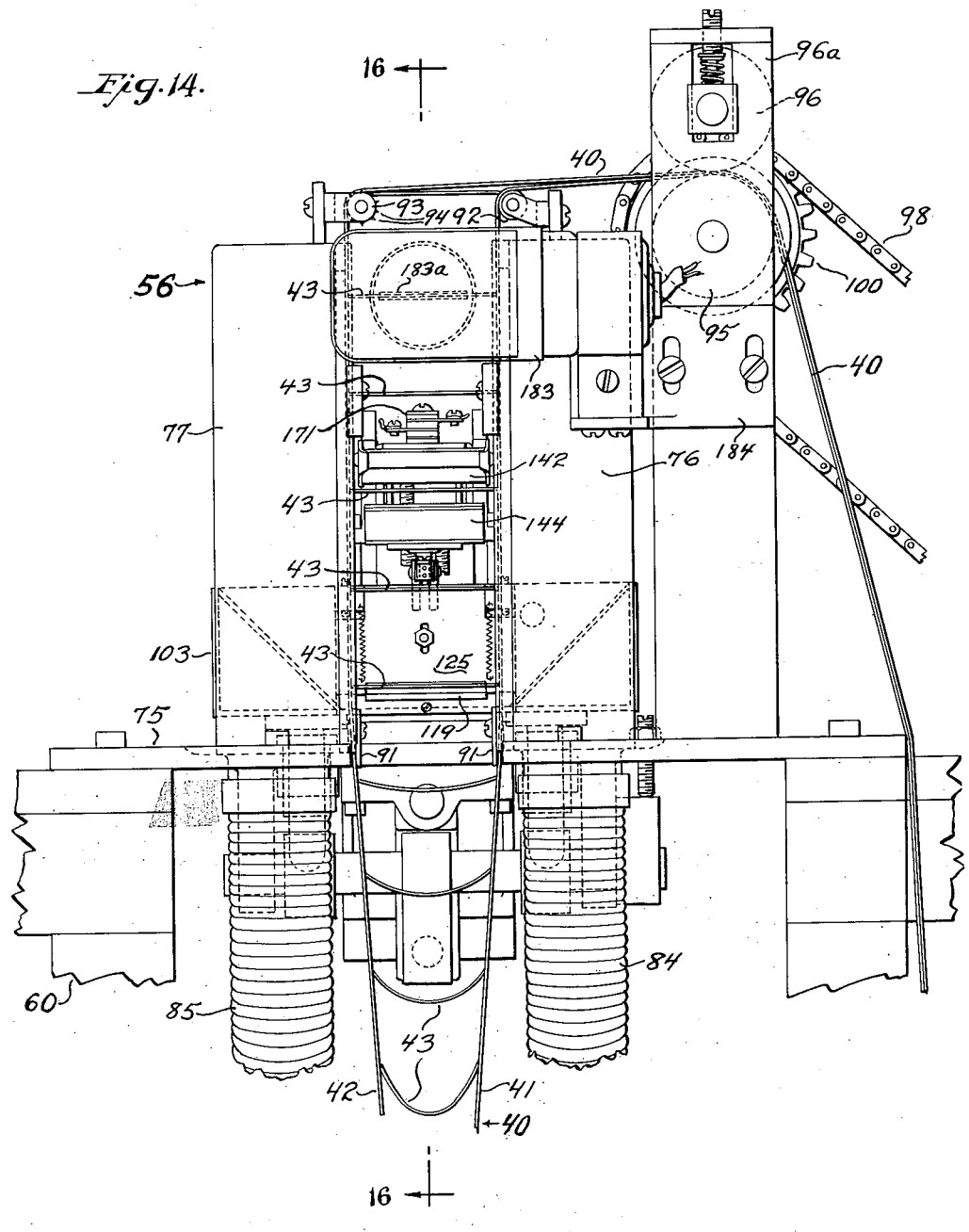

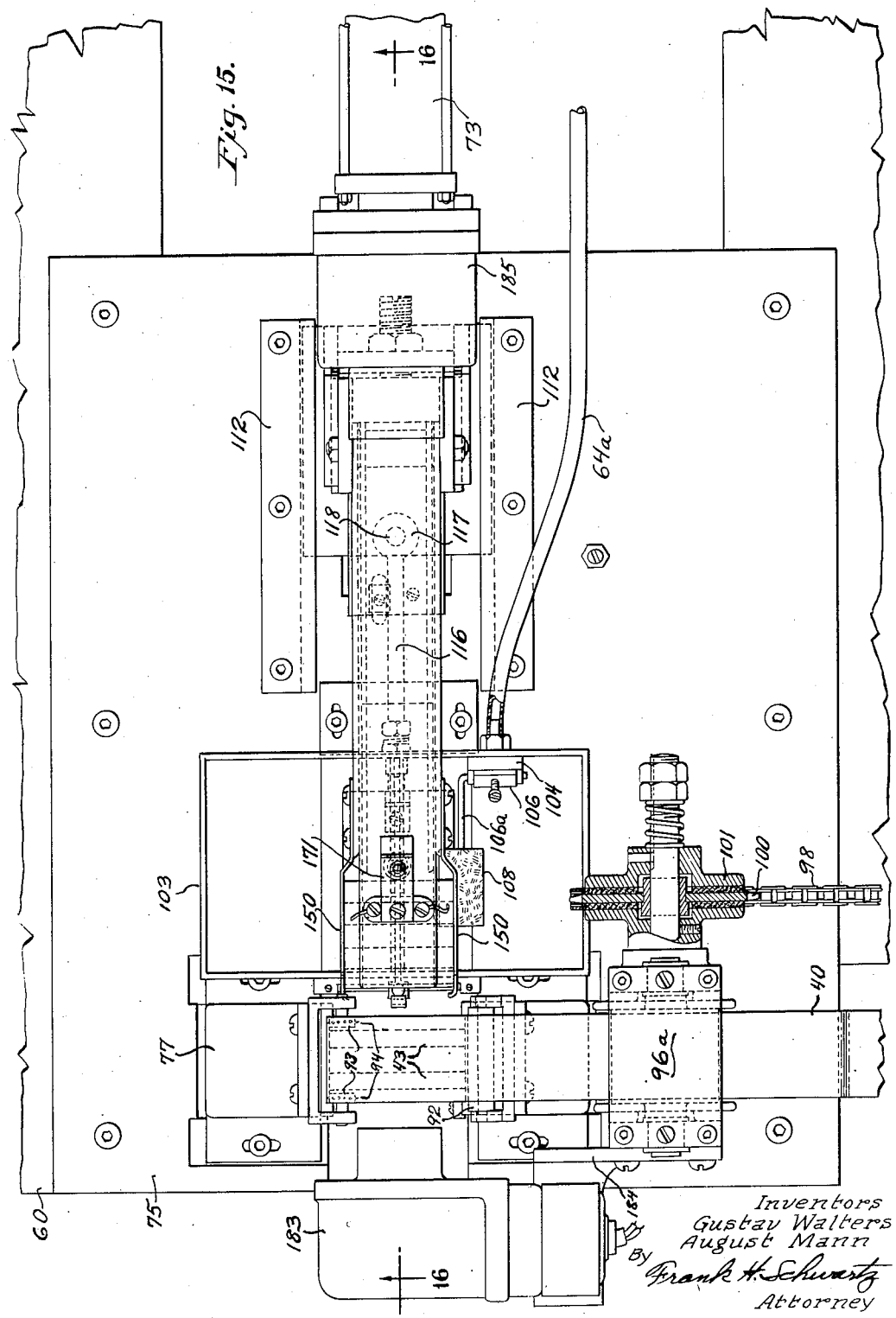

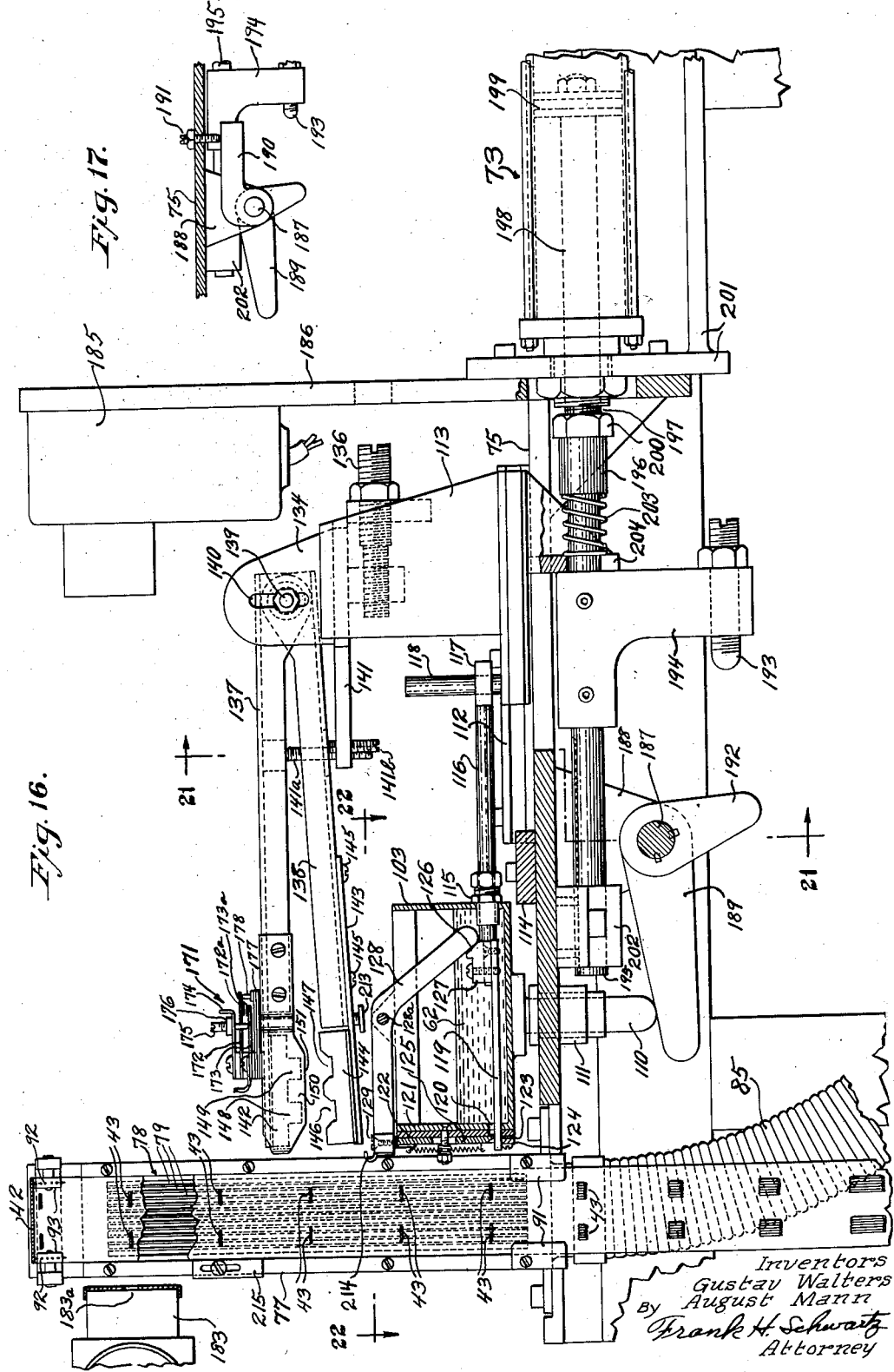

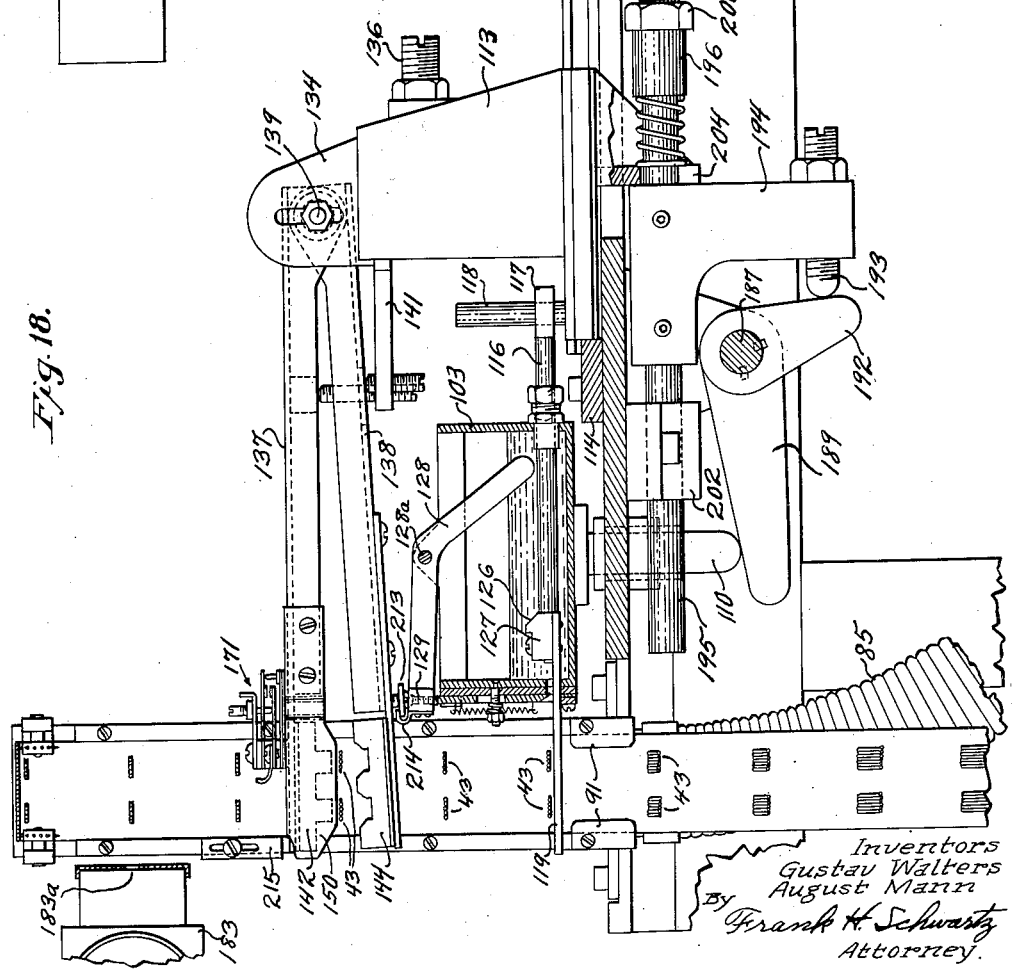

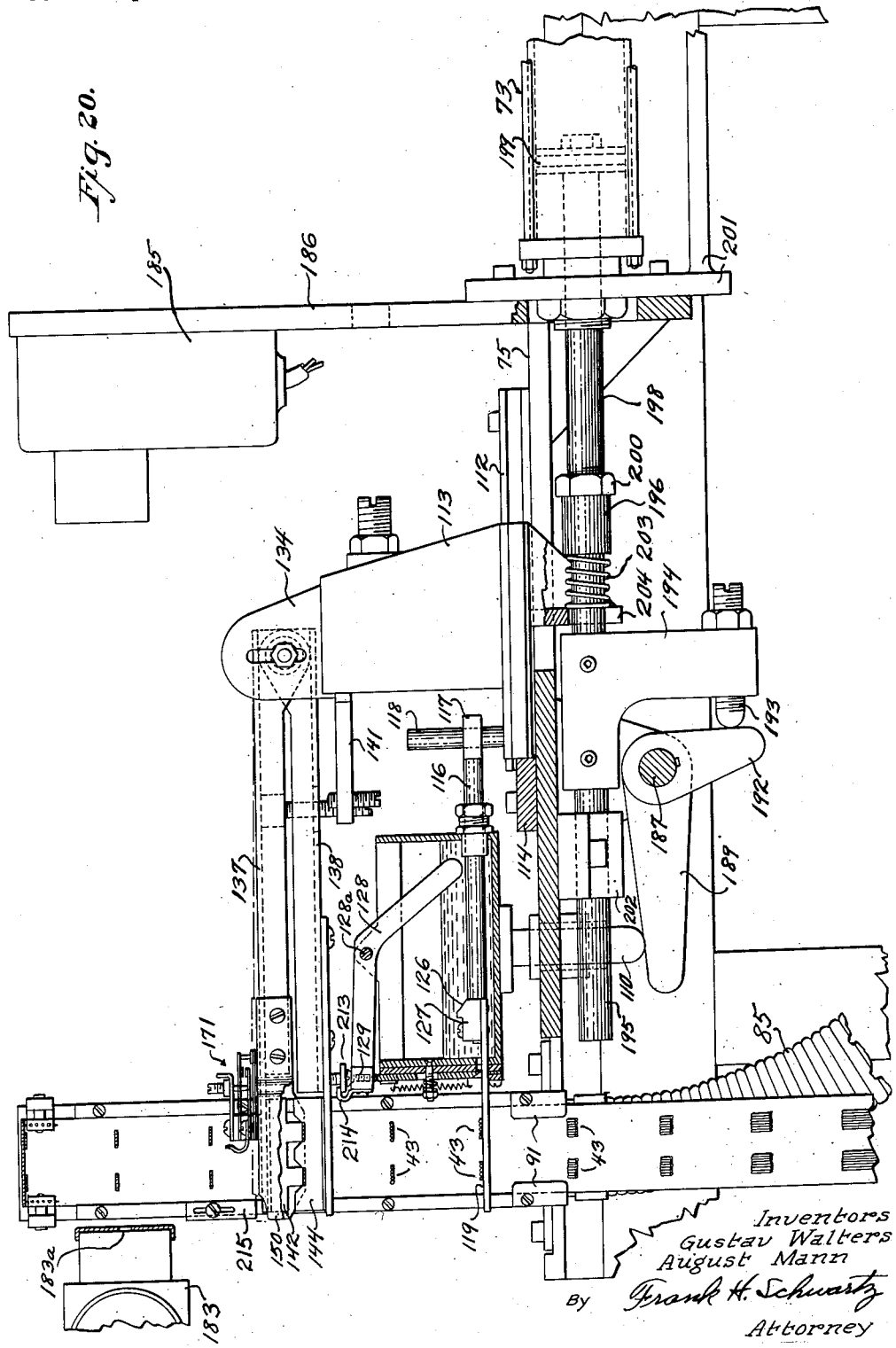

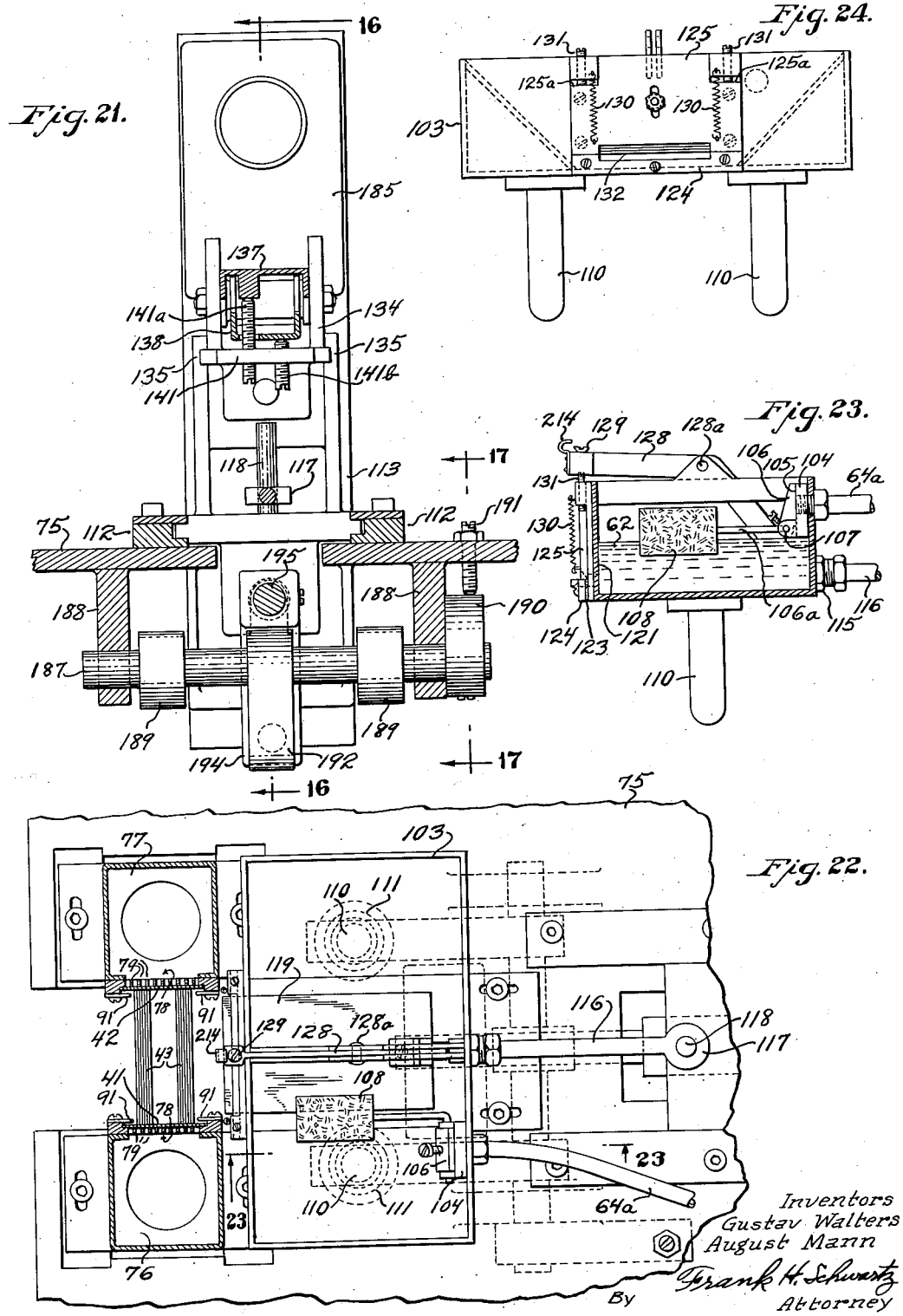

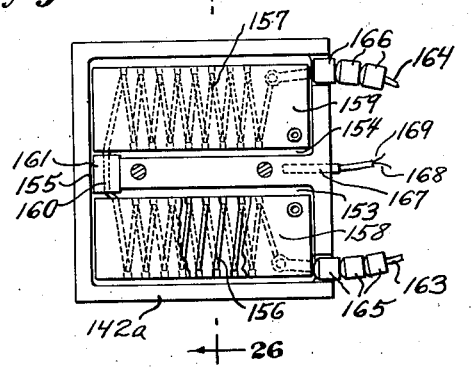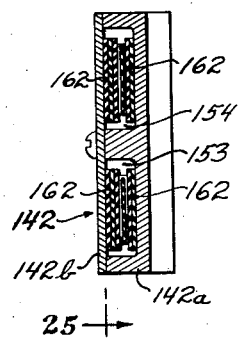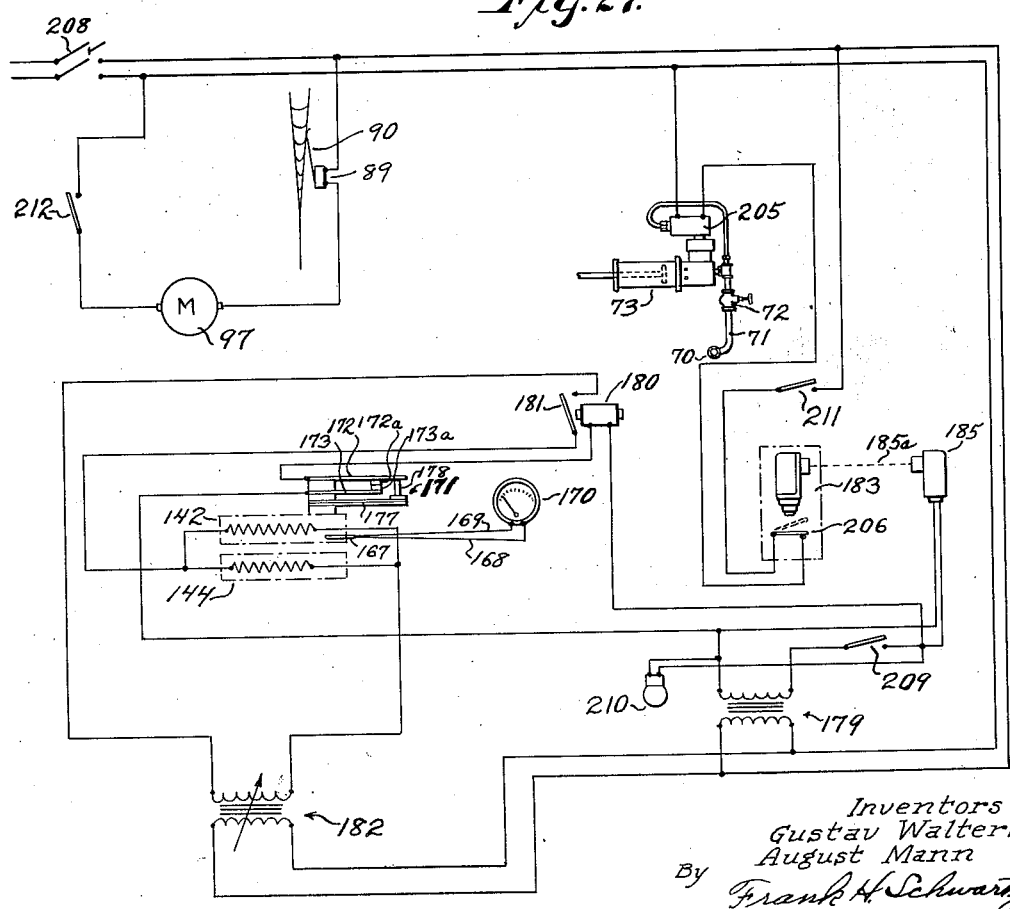

Aug. 20, 1957   G. WALTERS ET AL   2,803,288
APPARATUS FOR MAKING VENETIAN-BLIND LADDER TAPE
Filed July 26, 1954   10 Sheets-Sheet 10
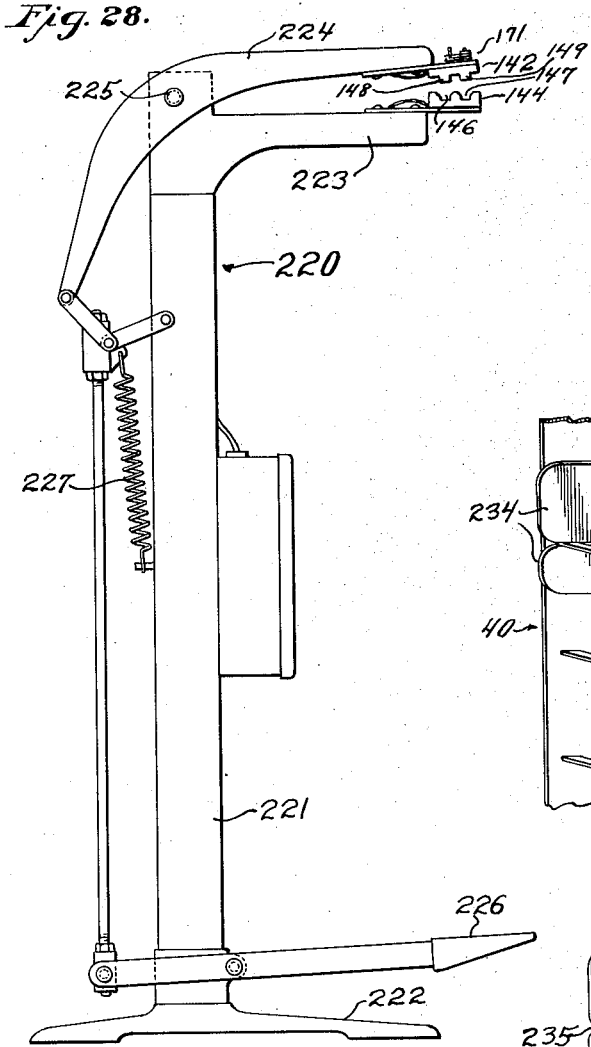
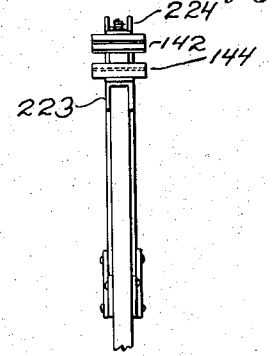
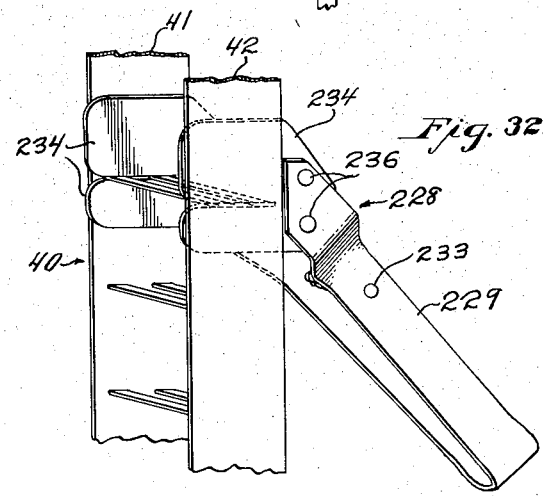
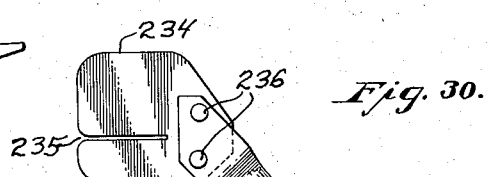
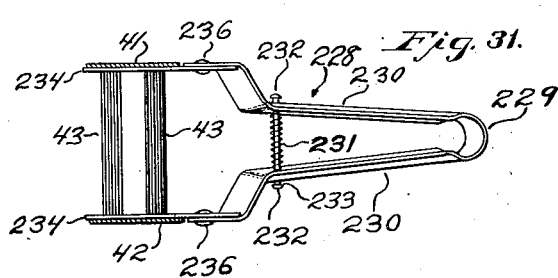
Inventors
Gustav Walters
August Mann
By Frank H. Schwartz
Attorney

# United States Patent Office 2,803,288
Patented Aug. 20, 1957

2,803,288

APPARATUS FOR MAKING VENETIAN-BLIND LADDER TAPE

Gustav Walters and August Mann, Middletown, Conn.; said Mann, assignor to The Russell Manufacturing Company, Middletown, Conn., a corporation of Connecticut Application July 26, 1954, Serial No. 445,686

6 Claims. (Cl. 154—1.6)

This invention relates to improvements in ladder tape or webbing also known as Venetian-blind tape, and to methods of and apparatus for making such tape. Such tape comprises a pair of front or face, and back or rear main tapes, between which extend the rungs or ladders which interconnect the two main tapes, and which also support the slats of the blind.

In the making of woven ladder tape, it has not been commercially practical to make twin-rung or twin-ladder, woven ladder tape with woven solid rungs or ladders at a reasonable price, because of very high cost of special equipment needed, and slow manufacture.

One object of this invention, therefore, is to initially make or provide woven twin-rung ladder tape with string ladders (non-solid, non-woven), each of a plurality of parallel ladder warp strands, and then convert each such non-solid ladder to a solid ladder by cementing the ladder warp strands of each ladder or rung together.

Another object of this invention is to provide a method and apparatus for making solid-rung ladder tape, from woven ladder tape that has been woven with non-solid, non-woven ladders each of a plurality of parallel ladder warp strands, by cementing the ladder warp strands of each ladder or rung together.

Other objects and advantages will appear to those skilled in the art from the following, considered in conjunction with the accompanying drawings.

In the description and claims, the various parts and steps are identified by specific terms for convenience, but they are intended to be as generic in their application as the prior art will permit.

In the accompanying drawings forming part of the present disclosure, in which certain ways of carrying out the invention are shown for illustrative purposes:

Fig. 1 is a full-scale, side-edge view of a fragment of twin-rung or twin-ladder, string-ladder, initial-stage ladder tape as woven;

Fig. 2 is a view similar to Fig. 1, but with the ladder tape opened out after the cross-over floats have been cut;

Fig. 3 is a sectional view on line 3—3 of Fig. 2;

Fig. 4 is a view similar to Fig. 3, of staggered-rung or staggered-ladder ladder tape;

Fig. 5 is a sectional view on line 5—5 of Fig. 2;

Fig. 6 is a view similar to Fig. 5, after the ladder warp strands of each of the string-ladders have been cemented together, to form solid-ladders;

Fig. 7 is an enlarged sectional view of one of the cemented ladders, on line 7—7 of Fig. 6;

Fig. 8 is an enlarged schematic sectional view on line 8—8 of Fig. 3;

Fig. 9 is an enlarged view of the area 9 of the main tape shown in Fig. 3;

Fig. 10 is a schematic sectional view on line 10—10 of Fig. 9;

Fig. 11 is a view similar to Fig. 10, with different main-tape warp strands;

Fig. 12 is a front elevation of a group of four ladder-cementing units or machines;

Fig. 13 is a top plan view of Fig. 12;

Fig. 14 is an enlarged front elevation of the upper or main portion of the left-hand unit shown in Fig. 12, shown on one-half scale of the actual size of the unit;

Fig. 15 is an enlarged plan view of the front, left portion of the left-hand unit shown in Fig. 13;

Fig. 16 is a sectional view on line 16—16 of Figs. 14, 15, and 21;

Fig. 17 is a reduced-scale sectional view on line 17—17 of Fig. 21;

Fig. 18 is a sectional view similar to Fig. 16, with the platens and cement applicator fully advanced, but with the lower platen and cement applicator not raised;

Fig. 19 is an enlarged view of the cement applicator, and cement and related parts shown in Fig. 18;

Fig. 20 is a sectional view similar to Fig. 18, but with the lower platen and cement applicator in a raised position;

Fig. 21 is a sectional view on line 21—21 of Fig. 16;

Fig. 22 is a sectional view on line 22—22 of Fig. 16;

Fig. 23 is a sectional view on line 23—23 of Fig. 22;

Fig. 24 is a front elevation of the cement-pan assembly detached, and with some of the elements omitted;

Fig. 25 is a view of the upper heating platen, on line 25—25 of Fig. 26;

Fig. 26 is a sectional view on line 26—26 with the cover-plate thereon;

Fig. 27 is a schematic wiring diagram for one of the machine units;

Fig. 28 is a side elevation of a modified form of ladder-cementing device;

Fig. 29 is a right end elevation of the upper portion of Fig. 28;

Fig. 30 is a side elevation of a ladder-tape spreader and holder;

Fig. 31 is a top plan view of Fig. 30 with a piece of ladder tape held therein before the cementing operation; and Fig. 32 is a perspective view of the ladder tape spreader and holder with a piece of ladder tape held therein, after the cementing operation.

Referring to Figs. 1 to 3, and 5 to 10 of the drawings, the woven, twin-rung or twin-ladder ladder tape 40 includes a front or face main tape 41, and a back or rear main tape 42, with the two main tapes interconnected by ladders or rungs 43 which are connected to the main tapes by weaving at weave-ins or weave-in areas 45 in a way well understood by those skilled in the art.

Each of the main tapes 41, 42 is formed by having main-tape warp strands 46 extending throughout the length of the main tape and interwoven with the weft picks of a weft strand 47.

At the same time that the two main tapes 41, 42 are woven, each of the ladders or rungs 43 is formed of a plurality of ladder warp strands 48 arranged in general side-by-side relation as most clearly shown in Figs. 3, 5, and 7. As is well understood by those skilled in the art, as the weaving of the ladder tape progresses, the ladder warp strands 41 of each group of ladder warp strands, after being woven to one main tape 41 at a weave-in area 45 (near the bottom of Fig. 1) then crosses as cross-over floats 49 to the other main tape 42 where they are woven in at the next weave-in area, then as a group of ladder warp strands 48 constituting a ladder 43, extending back to the main tape 41 where they are woven in at the next weave-in area, and so on, to constitute a woven ladder tape. Before the ladder tape can be used in a Venetian blind, the cross-over floats 49 are cut to permit the ladder tape to be opened out from the as-woven form of Fig. 1, to the form shown in Fig. 2.

After the cross-over floats have been cut, cement 50 is applied to each ladder or rung 43 (Figs. 6, 7) as hereinafter set forth, to cement the ladder warp strands of each ladder together to constitute a solid ladder or rung. Heretofore in the art of Venetian blind or ladder tape, when each ladder merely consists of a plurality of parallel ladder warp strands or strings such as shown in Fig. 5, such ladders are known as string ladders, and where a ladder weft strand is woven with the ladder warp strands (not shown) such ladders are known as solid ladders or solid woven ladders. Similarly, the cemented ladders 51 (Figs. 6, 7) may be referred to as solid ladders. It is advantageous to have portions 52 of the ladders adjacent the main tapes, free of cement, for reasons including to give greater flexibility to the juncture of the ladders and the main tapes.

Fig. 4 illustrates a ladder tape 53 known in the art as staggered ladder or rung ladder tape. And except that its ladders are only half the number of ladders that are in twin-ladder or rung ladder tape, and are arranged staggered these ladder tapes are otherwise essentially alike.

In Figs. 9 and 10 the main-tape warp strands 46 may be made of cotton or any other suitable material, and while the weft strand 47 is shown of a continuous multi-filament synthetic strand of less than seven turns per inch so the filaments will flatten out where they press against a warp strand, any other suitable weft strand may be used. In Fig. 11, a fragment of a modified main tape 54 is shown with warp strands 55 of flattened form which may be monofilament strands of Saran or other suitable plastic.

In carrying out this invention, there is first provided what may be called an initial-stage woven ladder tape such as illustrated in Figs. 1 to 5, and 8 to 11 of the drawings, with non-woven, non-solid ladders or rungs of separate ladder-warp strands 48 as best shown in Figs. 3, 5 and 8. Then the ladder-warp strands of each ladder are cemented together as illustrated in Figs. 6 and 7 to thus make each ladder a solid, non-woven ladder. In carrying out this ladder-cementing method, certain mechanism is advantageously employed, as hereinafter set forth.

Referring to Figs. 12 and 13, a group of essentially identical ladder-cementing units or machines 56, 57, 58 and 59 are mounted on a support bench or table 60. A main cement-supply tank 61 holds liquid cement 62 which flows through a pipe 63 to four control valves 64, each connected to a flexible cement-supplying tube 64a for each machine unit. A compressed-air pipe 65 leads from an air-compressor (not shown) to a moisture-condensate container 66, then through a usual air filter 67 and a lubricator 68, down through a pipe 69 to a compressed-air line or pipe 70 which extends along most of the length of the support bench 60 and is connected through four pipes 71 (Fig. 27) to four hand control valves 72, each of which valves 72 controls the admission of the supply of compressed air to a reciprocating air-motor 73 of each cementing machine unit, to operate certain of the mechanism of the cementing machines 56, 57, 58, 59. A compressed-air pressure of about eighty to ninety pounds per square inch is satisfactory. And a vacuum or suction supply pipe 74 leads from a vacuum pump (not shown) and along most of the length of the support bench 60 to operate certain of the mechanism of each of the four machines 56, 57, 58, 59. Of course, more than, or less than, four machines or units could be employed as a group. And as all the cementing-machine units are essentially identical, a description of the construction and operation of only one of them will be given.

Referring to Figs. 12 to 26, a base plate 75 is secured on to the top of the support bench 60. A pair of suction or vacuum boxes 76, 77 are secured to the base plate 75, and each suction box has a grating or grill 78 with longitudinal grating bars 79. The suction boxes 76, 77 respectively have suction hoses 84, 85, which hoses are connected to the suction or vacuum supply pipe 74. No particular degree of vacuum is employed, but the suction means employed is purposely of sufficient capacity to maintain a good suction at the gratings of the suction boxes even though there be considerable air leakage. But if less than all the machine units are to be operated at a given time, the gratings of the unused units are preferably covered with pieces of ladder tape to maintain the degree of suction of the units that are being operated, at the same degree as if all the units were being operated.

A quantity of ladder tape 40, which has had its float threads cut so it can be opened out as in Fig. 2, which is to have its ladders or rungs cemented in accordance with this invention, is mounted as a roll on a reel 86, and the free end of the tape is threaded or passed up between a friction wheel 87 and a pivoted friction block or drag 88, and then past a micro-switch 89, the arm 90 of which is pressed to the right by the tension on the ladder tape to hold the switch closed against a spring which tends to swing the switch open. The ladder tape 40 is opened up as shown (Figs. 12, 14), as it has its main tape 41 passed under two guide plates 91 and up along the grating 78 of the suction box 76, and has its main tape 42 passed under two guide plates 91 and up along the grating 78 of the suction box 77. The main tape 41 is passed over the plain roller 92, and the main tape 42 is passed over the spaced-apart pair of rollers 93 each having projecting pins 94. The ladder tape 40 then passes in closed condition between the rubber-covered feed-rolls 95, 96, which are mounted in the frame 96a, the roll 95 being driven by an electric motor 97 through a speed-reducer unit 97a, a chain 98, sprockets 99, 100, and a slip-friction clutch 101. The feed roll 96 is merely a non-driven, spring-pressed presser-roll to hold the ladder tape in non-slipping engagement with the driven roll 95.

When the suction is turned on, the main tapes 41 and 42 are held out firm against the gratings of the suction boxes, so that the ladders 43 in the region between the suction boxes are held out straight as shown to permit of properly and speedily cementing the ladders. As the feed rolls pull the ladder tape 40 with cemented ladders through the machine 56, the ladder tape passes down into a suitable receiver such as the container or box 102.

The flexible tube 64a extends from the control valve 64 to a cement pan 103 where it is connected to a bushing 104 which has a valve seat 105 adapted to be engaged and closed by a valve closure 106 carried by a valve-arm 106a pivoted at 107, when actuated by a float 108 mounted on the valve arm, when the float is lifted by the liquid cement 62 rising to the desired level to be maintained in the cement pan 103. Two supporting studs 110 secured to the cement pan 103, are mounted for up-and-down sliding movement in bushings 111 mounted in the base 75. The cement-supplying tube 64a preferably is of ⅜" inside diameter tubing of any suitable material which has sufficient flexibility and elasticity to readily accommodate itself to the movements of the cement pan 103.

A pair of slideways 112 are secured on to the base 75, and slidably receive a main slide 113 which, at the end of its forward movement, engages against a slide-stop 114 secured to the base 75. A bushing 115 is mounted in the rear wall of the cement pan 103, and slidably receives an applicator-plate support-rod 116 which has an eye portion 117 at its rear end engaged over and slidable up and down on a pin 118 secured to the slide 113. A cement applicator plate or blade 119 has its rear end secured to the forward end of applicator rod 116, and its forward end is adapted to be projected forward through an opening generally designated as 120. This opening 120 is formed by an opening through the forward wall 121 of the cement pan. A backing plate 122 is secured to the forward wall of the cement pan and has the same size of opening as that in the said forward wall of the cement pan. A felt gasket 123 of general elongated V-shape, is clamped in place by a retainer plate 124 of the same size and shape, with the gasket against the under face and side edges of the applicator plate 119 to minimize leakage of cement out along the side edges and under surface of the applicator plate.

When the applicator plate 119 is in the retracted position (Fig. 16), the vertically slidable gate 125 is held down in closed position against the top face of the applicator plate by a cam face 126 of the cam block 127 carried by the applicator rod 116 pressing against the rear lower end of a bell-crank lever 128 pivoted at 128a, the other end of which lever carries an adjustable screw 129 which the lever presses down against the top edge of the gate 125. When the rod 116 starts to move forward, the cam face 126 releases pressure against the rear lower end of the lever 128 and permits the springs 130 (Fig. 24) to lift the gate 125 to bring its edges 125a against the adjusting screws 131 to provide a predetermined distance of opening 132 to provide a thickness of coating of cement 133 of perhaps one thirty-second of an inch more or less on the upper face of the applicator plate 119 (Fig. 19) as the latter moves forward (Fig. 18).

After the cement has been applied to the ladders as will be hereinafter explained, and the applicator plate 119 and cooperating parts have been returned to the position shown in Fig. 16, the cam face 126 of cam block 127 causes the bell-crank lever 128 to push the screw 129 and gate 125 down against the applicator plate to prevent leakage of cement out along the top face of the applicator plate 119.

A heater-platen adjustor slide 134 (Figs. 16, 21) is slidably mounted in slide-ways 135 in the upper portion of the main slide 113, and is adjustable forward and rearward by the double threaded adjusting screw 136. A pair of upper and lower heater-platen carrying arms 137, 138 are pivoted together at 139, which pivot is adjustable up and down in the slot 140. The slide 134 has an arm 141 through which screws 141a, 141b are threaded to respectively adjustably support the arms 137 and 138. The upper arm 137 is secured to the upper heater platen 142, and the lower arm 138 has a forward flat plate 143 secured to the underside of the lower heater platen 144, the plate 143 being longitudinally adjustably secured to the lower arm by screws 145 to permit of the ladder-receiving slots 146, 147 of the lower platen 144 to be aligned perfectly with the respective ladder-pressing projections 148, 149 of the upper platen 142. A pair of platen-guards 150 are secured to opposite sides of the upper arm 137, and each guard has a straight lower edge 151 to prevent the ladders from catching on the projections 148, 149 of the upper platen, when the platens are being withdrawn rearwardly after a cementing operation.

Each platen is of steel and is similarly electrically heated by two connected flattened coils of Nichrome ribbon. Thus in Figs. 25, 26, the base 142a of the upper platen 142 has two parallel shallow wide recesses 153, 154 connected together by a channel 155, in which are two flattened coils of Nichrome ribbon 156, 157 respectively wound around sheets of insulation such as mica 158, 159, in the slotted edges thereof, and connected together by an integral portion 160 of the ribbon element extending through insulation such as a porcelain bead 161 in the channel 155. Suitable insulation, such as one or more layers of sheet insulation such as mica 162 is arranged above and below the coiled heating elements, to preferably fill the recesses 153, 154. Electric lead-wires 163, 164 are connected to the ends of the Nichrome ribbon and respectively extend out through porcelain insulation beads 165, 166. A cover plate 142b is secured to the base 142a of the platen 142. A pyrometer includes a thermo-electric-couple 167 secured in a hole in the base of the upper platen 142 (Figs. 25, 27) connected by the two lead wires 168, 169 to the temperature-indicating dial 170 which shows the temperature of the upper platen 142.

Secured on top of the upper platen 142, is a thermostat 171 (Figs. 16, 27) for controlling the temperature to which the platens are heated. The thermostat 171 includes a pair of electric contact members 172, 173, respectively having electric contacts 172a, 173a, and an arm 174 to which is threaded an adjusting screw 175, on which is threaded a lock nut 176. The adjusting screw 175 extends freely down through a hole in the upper contact member 172 and engages against the lower contact member 173. The thermostat 171 is normally adjusted so that the electric contacts are normally closed when the platen 142 is below proper operating temperature, in order to permit electric current to flow through the heating elements of the two platens to heat them to proper temperature. A bimetal operating arm 177, when it heats up sufficiently by heat radiated from and/or conducted by contact with the upper platen, bends upwardly to cause its pin 178 to push and hold the upper member 172 and its contact 172a up away from the lower member 173 and its contact 173a to shut off the heating current until the bimetal arm 177 cools down sufficiently to move its pin 178 down sufficiently to permit the contacts 172a and 173a to again make contact to thus again turn on the heating current, and so on.

The thermostat contacts make and break a six-volt current from the transformer 179 (Fig. 27) through the coil 180 to close and open the relay switch 181 which controls a 36-volt heating current from the transformer 182 through the heating elements of the two platens. Although an independent thermostat and an independent pyrometer could be employed for each platen, this has not been found necessary, as the two platens are maintained at suitable operating temperature by means of only one thermostat as shown.

A preferred type of cement for carrying out this invention is a plastisol, and a suitable composition thereof is made by mixing 100 parts by weight of powdered poly-vinyl chloride with 70 parts by weight of di-hexahydrophthalate plasticizer; in a way well understood by those skilled in the art. When this cement is heated to from 325° to 350° F., it quickly forms a unitary tough cement. This mode of cementing may be referred to as "hot-cementing" or as "hot-plastisol-cementing."

In order to apply the cement to the ladders and to heat-press and cure the cemented ladders in properly timed relation with the travel of the ladder tape through the machine, an electric eye is employed which comprises a photo-electric relay unit 183 having its bracket 184 adjustably secured on the frame or column 96a, and a photo-electric light source 185 secured on a post 186 extending up from the base 75, the parts 183, 185 being so arranged as to actuate the photo-electric relay unit 183 when a ladder 43 in its travel interrupts the light beam 185a (Fig. 27) of the light source 185 to the relay unit 183. To work satisfactorily, the relay unit should have a wide thin slot such as 183a (Fig. 14).

A rock-shaft 187 (Figs. 16, 21) is pivoted in bearings 188 depending from the base 75, and has secured to it a pair of pan-lifting levers 189 adapted to slide the studs 110 upward to lift the cement pan 103. An arm 190 secured to the rock-shaft 187 is adapted to be adjusted by a screw 191 to cause the pan-lifting levers 189 to hold the supporting studs 110, and consequently the cement pan 103, at any necessary desired elevation. A bumper lever 192 is secured to the rock-shaft 187, and is adapted to be engaged and rocked by the end of a bumper screw 193 adjustably mounted in the arm 194 secured to a piston-rod extension 195 which has an enlarged rear end portion 196 threadedly engaged over the forward threaded end 197 of the piston rod 198 of the piston 199 of compressed-air motor 73, and locked thereon by a lock nut 200. The air motor 73 is mounted on a bracket 201 secured to the base 75. The piston-rod extension 195 has its forward end portion longitudinally slidably and non-rotatably mounted in the bearing block 202. A compression spring 203 is mounted on the piston-rod extension 195, between the enlarged portion 196 of the piston-rod extension and the depending arm 204 of the main slide 113.

The compressed-air motor 73 is a standard product known as Bellows Solenoid-Operated Valve-Controlled Air Motor No. BSKM–2–Stroke 3", sold by The Bellows Co., Akron, Ohio. The said air motor 73 employed herein (Figs. 13, 16, 27) includes an electric solenoid 205, which is operated by a relay switch 206 of the photo-electric relay unit 183 (Fig. 27), which relay switch 206 is held open while the light beam 185*a* from the light source 185 is shining into the slot 183*a* of the relay unit 183, and is permitted to close when the light beam is interrupted, as by a ladder 43 of the ladder tape 40.

The photo-electric relay unit employed, is CR7505–N–110–G–11, and the photo-electric light source employed, is CR7505–200–G–1, both being standard units sold by the General Electric Co., Schenectady, N. Y. The said relay unit 183 can be, and is, adjusted so that after the relay switch 206 has been closed by interruption of the light beam 185*a* by a ladder of ladder tape, the relay switch 206 will not again be opened by restoration of the light beam as a result of the ladder moving away from the light beam, until after a precise predetermined time in seconds of time-delay has taken place. This time-delay or time-period is for the purpose of permitting the solenoid-air motor mechanism to complete its cycle of operations, which will hereinafter be described.

Now assuming the apparatus to contain an adequate supply of cement, and a roll of ladder tape which is to have its ladders cemented, to be properly threaded into the machine, and the apparatus of the machine unit 56 to be in the positions and conditions indicated by Figs. 12, 13, 14, 16 and 27, an overall description of the operation thereof will be given. First, the operator closes the 115-volt hand switch 208 (Fig. 27). Then he starts the air compressor and the vacuum machine. Then he closes the hand switch 209, with the result that inasmuch as the platens 142, 144 are assumed to now be cold or below operating temperature, the contacts 172*a*, 173*a* of the thermostat 171 are in closed condition, and therefore the current from the 6-volt side of the transformer 179 will pass through the coil 180 and pass on through the closed contacts 172*a*, 173*a* of the thermostat 171, and in passing through the coil 180, the 6-volt current will close the relay switch 181, which will pass 36-volt heating current from the 36-volt side of the transformer 182 through the heating elements of the heater-platens 142, 144; also, the 6-volt current will light the pilot light 210, and will light the photo-electric light unit 185 which will cause its light beam 185*a* to enter the slot 183*a* of the photo-electric relay unit 183 and cause it to lift its relay switch 206 thereof to open (dotted-line) position.

Then the operator watches the dial 170 of the pyrometer until, after ten minutes more or less, the dial registers a correct operating temperature of the platens of somewhere in the range from 410° to 430° F., when he closes the hand switch 211 which completes the circuit through the photo-electric relay unit 183 and the solenoid 205, except as to the relay switch 206 which is now held up in its dotted-line open position by the action of the light beam 185*a*, ready so that the instant the light beam 185*a* from the light unit 185 to the relay unit 183 is interrupted by a ladder of the ladder tape, the switch 206 will drop to its full-line closed position to thus close the circuit through the solenoid 205, which will cause the reciprocating air motor 73 to go through its complete forward and back cycle of operations.

Now everything being in complete readiness for the actual start of the ladder-cementing operations, the operator closes the hand switch 212 which starts the electric drive motor 97 which causes the ladder tape 40 to be drawn upward (Figs. 12, 14, 15, 16), and have its main tapes 41, 42 spread apart and the ladders 43 straightened out by the action of the suction boxes 76, 77. Now when the light beam 185*a* is interrupted by a ladder, the photo-electric relay switch 206 is caused to drop to its full-line position (Fig. 27) which closes the electric circuit through the solenoid 205 which promptly causes its air control valve (not shown) to cause compressed air to actuate the piston 199, piston rod 198 and piston-rod extension 195 to move forward from their position in Fig. 16 through the position in Fig. 18 and to the position in Fig. 20. During this forward motion of the piston-rod extension 195, the cement applicator plate 119 with a layer or coating of cement 133 thereon, and the pair of heated platens 142, 144, move forward to the position shown in Fig. 18 in which position any further forward movement of the applicator plate 119 and platens 142, 144 is stopped by the slide 113 engaging against the stop 114, whereupon further forward movement of the part 196 of the piston-rod extension 195 against the spring 203 causes the bumper screw 193 to act through the parts 192, 189, 110, 125 and 129 to raise the applicator plate 119 to apply cement on the underneath surface of the pair of ladders 43 directly above the applicator plate (Fig. 20), and to push the lower platen 144 up to closed position with upper platen 142, and to further push the parts 119 and 144 up a little further (indicated by the broken-line outline above the upper platen 142 and upper arm 137), to push the upper platen 142 firmly up against the adjustable limit-stop 215, to firmly clamp the heated platens 142, 144 on to the third pair of ladders 43 above the ones on which cement is being applied, to be heated to cure the cement on the first pair of said ladders that have had cement applied to them by the applicator plate 119, and to hold said ladders and the ladder tape of which they are a part, from further upward movement during the less than two-seconds of the cement curing by the platens, by virtue of the slip friction clutch 101 of the motor drive for the ladder tape.

Then, owing to the pre-set, predetermined length of time-delay for the relay switch 206 having expired, and as the light beam 185*a* of the photo-electric light source is shining into the slot 183*a* of the photo-electric relay unit 183, the relay switch 206 is now lifted to the dotted-line open position to cause the solenoid 205 to move back to its original position and cause the piston-rod extension 195 to be moved rearward in reverse direction, which through the parts previously described, plus the pull screw 213 on the plate 143 and the hook 214 on the bell-crank lever 128 pulling on the screw 213, pulls the lower platen 144 down quickly from its position in Fig. 20 to the position shown in Fig. 18, whereupon all the parts are returned to their positions shown in Fig. 16, to thus release the grip of the platens upon the ladders and retire all parts of the mechanism out of the path of travel of the ladders, whereupon the slip-friction clutch 101 resumes its non-slip part in the feed of the ladder tape upward, so that presently the next pair of ladders 43 interrupt the light beam 185*a* to cause the cycle of operations to be repeated to cement the pair of ladders next following the pair of ladders that were previously cemented, and so on.

One complete forward and back cycle of operations of the air motor and of all parts operated during the forward and back movement of the piston-rod extension, occupies less than two seconds of time. Among the reasons for this speed, are: that the electric eye control gives quick, accurate instant-of-start of the cycle, and accurate control thereof; that the air motor and its solenoid control give quick forward and back, air-cushioned movements; and that having the heater platens at a temperature of about 410° to 430° F., while the cement requires only a short exposure of less than one second to 325° to 350° F. to cure it, makes it unnecessary to keep the cement in contact with the platens until the cement is brought up to the temperature of the platens.

In the modified form of the invention illustrated in Figs. 28 to 32, the ladder-cementing device 220 comprises a standard 221 extending upward from a base 222, and having a fixed jaw 223 at its upper end. A pivoted jaw 224 is pivoted at 225. The jaws 224, 223 respectively have electrically-heated heating platens 142, 144 and a thermostat 171, the same in all essentials as previously described in connection with the previously described form of the invention. The pivoted upper jaw 224 is swung down by pressure down on the foot pedal 226 against the action of a spring 227. A ladder-tape spreading and holding device 228 has a handle 229 with two arms 230 normally pushed apart by a coil spring 231 against the limiting heads 232 of a limit pin 233 loosely slidable through the arms 230. A spreader and holder plate 234 having a slot 235, is secured by rivets 236 to the outer end of each arm 230.

In use, a piece of ladder tape 40 is mounted in the spreading and holding device 228 with the string ladders 43 in the slots 235 and with the main tapes 41, 42 against the outer faces of the two spreader and holder plates 234 as shown in Fig. 31. Then the string ladders 43 are given a coating of cement by means of a brush or other suitable means, and the ladders are placed in proper position in the slots 146, 147 of the lower heater platen 144, and the foot pedal 226 is pressed down to swing the upper heater platen 142 down to cause the ladder-pressing projections 148, 149 of the platen 142 to enter the slots 146, 147 in the platen 144 to press and cure the cement on the ladders, as described concerning the previous form of the invention.

Of course where it is so desired, for economy of manufacture or other reason, to cement string ladders on staggered-rung ladder tape, it obviously can be done in either of the foregoing described forms of apparatus without any changes therein, as will be obvious.

Instead of using a plastisol cement as hereinbefore described, any other suitable cement may be employed, whether liquid, solid as strip or sheet or other form, or by weaving alternate ladder warp strands composed substantially of any suitable non-heat-cementable fibres, and the other alternate ladder warp strands composed substantially of cellulose acetate or other heat-cementable fibres, or by weaving each ladder warp strand of a mixture of non-heat-cementable fibres, and heat-cementable fibres. And the use of platens for pressing the opposite surfaces of the ladders during curing, not only aids in causing the ladder warp strands to become cemented to one another, but also gives advantageously smooth opposite faces to the cemented ladders. Such of the ways of cementing hereinbefore described in this paragraph as employing heat in connection with the cementing operation may be referred to as "hot-cementing."

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. Apparatus for treating ladder tape of the type having a pair of woven main tapes joined by rungs which are woven into the main tapes at spaced points, said apparatus comprising feed means to advance said ladder tape step-by-step to an applicator station and a heat setting station, a pair of guide members adapted to receive and guide said main tapes as they are advanced by said feed means, said guide members being spaced to separate said main tapes and thereby extend said rungs to flat form, a cement applicator at said applicator station including a member adapted to advance and retract for contacting said rung and having means applying a heat setting cement to said rung, a heat-setting member at said setting station adapted to advance and retract for applying heat for setting said cement on the rung in said setting station, and means causing said applicator member and said heating member to advance and retract in timed relationship with the step-by-step advance of said ladder tape imparted by said feed means.

2. Apparatus as set forth in claim 1 in which said step-by-step feed means, comprises a feed sprocket, means driving said feed sprocket, a photoelectric cell positioned to sense a rung and means responsive to said cell to interrupt said driving means and to advance said cement applicator member and said heating member.

3. An apparatus as set forth in claim 1 in which said guide member includes vacuum means for holding said main tapes in a predetermined path.

4. An apparatus as set forth in claim 1 in which said guide member comprises a pair of plates from which the respective main tapes pass and vacuum means associated with said plates to hold said main tapes in contact therewith.

5. An apparatus as set forth in claim 1 in which said cement applicator member comprises a blade, and a reservoir for said cement is positioned and adapted to apply a coating of cement to said blade when said blade is retracted.

6. An apparatus as set forth in claim 1 in which said heating member comprises a pair of elements adapted to clamp said rung therebetween and heating means is provided for heating one of said elements.

References Cited in the file of this patent

UNITED STATES PATENTS

| | | |
|---|---|---|
| 328,286 | Carr | Oct. 13, 1885 |
| 2,405,579 | Hunter | Aug. 13, 1946 |
| 2,591,923 | Delegard | Apr. 8, 1952 |
| 2,636,522 | Evans | Apr. 28, 1953 |

FOREIGN PATENTS

| | | |
|---|---|---|
| 701,351 | Great Britain | Dec. 23, 1953 |